United States Patent [19]

Mirabella et al.

[11] Patent Number: 5,426,153
[45] Date of Patent: Jun. 20, 1995

[54] HIGH IMPACT STRENGTH FILM GRADE POLYMERIC COMPOSITION

[75] Inventors: Francis M. Mirabella, Morris, Ill.; Stephen Imfeld, Mason; Michael L. Opacich, Loveland, both of Ohio; Edward M. Kajiwara, Park Ridge, Ill.

[73] Assignee: Quantum Chemical Corporation, Cincinnati, Ohio

[21] Appl. No.: 223,617

[22] Filed: Apr. 6, 1994

[51] Int. Cl.6 .................... C08L 23/08; C08L 23/20; C08J 5/16
[52] U.S. Cl. .................................. 525/222; 524/311; 524/315
[58] Field of Search ................ 525/222; 524/311, 315

[56] References Cited

U.S. PATENT DOCUMENTS

| | | |
|---|---|---|
| 3,399,250 | 8/1968 | Kirk et al. |
| 4,275,180 | 6/1981 | Clarke . |
| 4,450,457 | 2/1984 | Dobreski . |
| 4,451,536 | 5/1984 | Barlow et al. |
| 4,503,102 | 3/1985 | Mollison . |
| 4,755,419 | 7/1988 | Shah . |
| 4,814,124 | 3/1989 | Aoyama et al. |
| 4,856,656 | 8/1989 | Sugimoto et al. |
| 4,877,827 | 10/1989 | Van Der Groep . |
| 4,878,974 | 11/1989 | Kagawa . |
| 4,883,837 | 11/1989 | Zabrocki . |
| 4,921,653 | 5/1990 | Aoyama et al. |
| 4,973,625 | 11/1990 | Deyrup . |
| 4,997,880 | 5/1991 | Van Der Groep . |
| 5,001,195 | 3/1991 | van der Groep . |
| 5,006,398 | 4/1991 | Banerji . |
| 5,039,565 | 8/1991 | Deyrup . |

FOREIGN PATENT DOCUMENTS

| | | |
|---|---|---|
| 209294 | 1/1987 | European Pat. Off. |
| 59-109543 | 6/1984 | Japan . |
| 152911 | 8/1985 | Japan . |

*Primary Examiner*—Carman J. Seccuro, Jr.
*Attorney, Agent, or Firm*—Gerald A. Baracka; William A. Heidrich

[57] ABSTRACT

A polymeric composition including a first copolymer of ethylene and a higher α-olefin having 3 to 12 carbon atoms, said first copolymer having a density of between 0.880 g/cc. and about 0.949 g/cc. and a melt index of between about 0.01 and about 100, present in the polymeric composition in a concentration of between about 60% and about 95% by weight; and a second copolymer of ethylene-vinyl acetate having a vinyl acetate content of at least about 28% by weight, based on the total weight of the ethylene-vinyl acetate copolymer, said second copolymer present in a concentration of between about 5% and about 40% by weight, said percentages by weight based on the total weight of the polymeric composition. This polymeric composition is particularly useful when fabricated into a film, which has excellent impact strength.

14 Claims, No Drawings

HIGH IMPACT STRENGTH FILM GRADE POLYMERIC COMPOSITION

BACKGROUND OF THE DISCLOSURE

1. Field of the Invention

The present invention is directed to a high impact strength film grade polymeric composition. More particularly, the present invention is directed to a polymeric composition which includes linear low density polyethylene (LLDPE) and an ethylene-vinyl acetate copolymer (EVA) containing at least about 28% by weight vinyl acetate (VA), based on the total weight of the ethylene-vinyl acetate copolymer.

2. Background of the Prior Art

The use of LLDPE, that is, a copolymer of ethylene and a higher α-olefin, as a polymeric film has significantly increased in recent years as a result of its acknowledged superior strength characteristics. Indeed, it is these properties that are critical which predicate the use of that film in that its strength properties, especially its impact strength, are critical to its use in such applications as a wrapping material, as a bag, as a container and the like. Polymeric films employed in such applications are subject to dropping, sudden impact and other challenges to their structural integrity.

Although LLDPE film has indeed found wide acceptance in view of its desirable strength properties, especially impact strength, over earlier polymeric films such as film formed of ethylene homopolymers, i.e. high density polyethylene and low density polyethylene, there is still a recognized need in this art for polymeric films, used in wrapping, bagging and the like, which possess even greater impact strength at comparative film thickness or equivalent impact strength at thinner gauges than those provided by LLDPE film.

Although the use of a polymeric composition comprising LLDPE and a second polymer to provide improved impact strength has not been expressly suggested in the prior art, it is known to combine LLDPE with other polymers for various and sundry purposes including the use of such a composition as a ply of a laminate film. For example, U.S. Pat. No. 4,856,656 to Sugimoto et al. discloses a multilayered polymeric film which comprises a low density polyethylene-based resin layer; a polyolefin-based resin expanded layer; and a high density polyethylene-based resin layer. Among the ethylene polymeric materials utilizable in the first recited low density polyethylene-based resin layer are low density polyethylene (LDPE), LLDPE and copolymers of ethylene and polar vinyl monomers of which an ethylene-vinyl acetate copolymer (EVA) is preferred. It is noted that the '656 patent suggests a mixture of EVA and not more than 50% by weight LDPE, LLDPE, ionomer or the like as preferable. It should be appreciated that the EVA contemplated for use in the low density polyethylene layer has a VA content of 5 to 35% by weight, preferably 7 to 30% by weight.

Although many references in the prior art disclose polymeric compositions which include LLDPE and EVA there are very few such polymeric compositions useful in film applications, especially compositions which comprise an EVA where the vinyl acetate (VA) content is sufficiently high to produce a film of excellent impact strength. For example, U.S. Pat. No. 4,877,827 and U.S. Pat. No. 4,997,880, both to Van Der Groep, describe a polymeric composition that comprises 30 to 70 parts by weight of an ethylenepropylenediene rubber (EPDM), 30 to 70 parts by weight of an EVA with a VA content of 18% to 40% by weight; and 1 to 25 parts of one or more other polymers. The latter, third "other" polymer is recited to be any thermoplastic or elastomeric plastic other than EPDM and EVA. Although the preferred third polymer can be any one of six rubber polymers it can also be an olefinic polymer such as LDPE or LLDPE. The composition of the '827 and '880 patents is employed as an additive to other polymers or polymeric compositions to improve impact strength, as a compatibilizer between a polymer and an inorganic filler, as a miscibility promoter of immiscible polymers and other uses, which, like these other functions, are unrelated to or divorced from its use as a film.

The above discussion establishes the absence in the prior art of a polymeric composition providing improved impact strength even over that provided by LLDPE films. This discussion also emphasizes the need in the art for an improved polymeric composition that can be employed to enhance the impact strength of polymeric films.

BRIEF SUMMARY OF THE INVENTION

A new polymeric composition has now been developed which provides an improved impact strength polymeric film compared to the polymeric films heretofore available in the art.

In accordance with the present invention, a polymeric composition is provided. The polymeric composition comprises a first copolymer of ethylene and an α-olefin having 3 to 12 carbon atoms, characterized by a density of between about 0.880 g/cc. and about 0.949 g/cc. and a melt index of between about 0.01 and about 100, present in concentration of between about 60% and about 95% by weight, based on the total weight of the polymeric composition. The polymeric composition further includes a second copolymer of ethylene and vinyl acetate, having a vinyl acetate content of at least about 28% by weight, based on the total weight of the ethylene-ethyl acetate copolymer. The second copolymer is present in a concentration of between about 5% and about 40% by weight, based on the total weight of the polymeric composition.

DETAILED DESCRIPTION

The polymeric composition of the present invention includes a principal amount of a first copolymer of ethylene and an α-olefin having 3 to 12 carbon atoms, characterized by a density of between about 0.880 g/cc. and about 0.949 g/cc. and a melt index, as determined by ASTM Test Procedure D-1238, of between about 0.01 and about 100. This first copolymer, commonly referred to as linear low density polyethylene (LLDPE), is further defined by an ethylene monomer molar concentration of at least about 85% and a higher α-olefin monomer molar concentration of up to about 15%, said concentrations based on the total molar concentration of the copolymer. The LLDPE constituent of the polymeric composition represents between about 60% and about 95% by weight, based on the total weight of the polymeric composition.

The polymeric composition includes a second polymeric constituent, a copolymer of ethylene and vinyl acetate (EVA), wherein the vinyl acetate (VA) comprises at least about 28% by weight, based on the total weight of the EVA. The EVA is present in the polymeric composition of the subject invention in a concentration of between about 5% and about 40% by weight, based on the total weight of the polymeric composition.

It is noted that degree of polymerization of the EVA constituent is not critical to the effectiveness of the subject polymeric composition. Thus, there is no limitation on number average molecular weight, weight average molecular weight, melt index or any other indicia of the degree of polymerization. Similarly, the degree of crosslinkage of the EVA, if any, is irrelevant to its use in the polymeric composition of the present invention. Suffice it to say, EVA's, having the characteristics required for use in the polymeric composition of the present invention, may be utilized independent of their molecular weight or degree of crosslinkage.

Preferably, the LLDPE component is present in the polymeric composition in a concentration of between about 70% and about 95% by weight, based on the total weight of the composition. In this preferred embodiment, the LLDPE comprises a copolymer of ethylene and an α-olefin having 4 to 8 carbon atoms. The ethylene in this preferred LLDPE copolymer is present in an amount of between about 90 mole % and about 99 mole %. The higher α-olefin is correspondingly present in an amount of between about 1 mole % and about 9 mole %. The density of the LLDPE employed in this preferred embodiment is between about 0.900 g/cc. and about 0.935 g/cc. The preferred LLDPE has a melt index Of between about 0.1 and about 10.

The EVA component of this preferred embodiment of the polymeric composition is characterized by a VA concentration in the range of between about 28% and about 65% by weight, based on the total weight of the ethylene-vinyl acetate copolymer. The EVA of this embodiment is representative of between about 5% and about 30% by weight, based on the total weight of the polymeric composition.

More preferably, the polymeric composition of the present invention includes an LLDPE component representative of between about 75% and about 90% by weight, based on the total weight of the polymeric composition. In this more preferred embodiment the LLDPE component is an ethylene-α-olefin copolymer wherein the ethylene comonomer is present in a molar concentration in the range of between about 92% and about 98% and the α-olefin comonomer is present in a molar concentration of between about 2% and about 8%. Moreover, in this more preferred embodiment, butene-1, hexene-1 or octene-1 is preferably employed as the α-olefin comonomer. Of these α-olefins, hexene-1 is most preferred for inclusion as the higher α-olefin in the LLDPE.

The LLDPE component of the polymeric composition is further defined by a density of between about 0.910 g/cc. and about 0.935 g/cc. The melt index of the LLDPE component of this more preferred polymeric composition is in the range of between about 0.5 and about 3.

The polymeric composition in this more preferred embodiment also includes an EVA component wherein the VA content is between about 30% and about 55% by weight, based on the total weight of the EVA. The EVA component, in this more preferred embodiment, constitutes between about 10% and about 25% by weight, based on the total weight of the polymeric composition.

The following examples are given to illustrate the present invention. Since these examples are given for illustrative purposes only, the scope of the invention should not be deemed limited thereto.

EXAMPLE 1

A polymeric composition was prepared by melt blending 90% by weight, based on the total weight of the polymeric composition, of a copolymer of 97.6 mole % ethylene and 2.4 mole % hexene-1 (LLDPE) having a density of 0.919 g/cc. and a melt index of 1, as determined by ASTM Test Procedure D-1238; and 10% by weight, based on the total weight of the polymeric composition, of an ethylene-vinyl acetate copolymer (EVA) which included 51% by weight vinyl acetate. This EVA copolymer had a melt index, again determined by ASTM Test Procedure D-1238, of 3.5. The LLDPE and the EVA copolymers were melt blended in a Banbury [trademark] mixer at 400° F. and the resulting product was pelletized.

Pellets of the above-defined polymeric composition were processed on a single layer blown film extrusion line. That extension line included a 2-inch diameter screw (24:1 L/D), a 4-inch diameter die, a 110 mils die gap and a dual lip air ring. The molten polymeric composition, maintained at a temperature of 425° F., was extruded at a rate of 6.4 lbs/(hr-inch of die circumference), a blow-up ratio of 2.2:1 and a frost line height of 14 inches.

The thickness of the resultant film was measured and tested to determine its physical strength properties. The impact strength of the film, a measure of the energy the film can absorb per unit area, was determined by the standard impact test for films, the so-called "dart impact strength" (DART) test. Dart impact strength reports the energy, in grams, required to cause breakage of half the film samples. The specific details of the dart impact strength test procedure are reported in ASTM Test Procedure D-1707. The specific steps set forth in this test procedure were followed in generating dart impact strength data.

The film formed in this example was additionally subjected to a second impact strength test, the total energy dart drop (TEDD) test. This test determines the impact resistance of the film, in pounds, by measuring the energy lost by a free falling dart as it passes through the film. This test is specifically defined and was conducted in accordance with ASTM Test Procedure D-4272.

A summary of this example, including the results of the aforementioned impact strength tests, is included in the Table.

EXAMPLE 2

A polymeric composition which comprised the same LLDPE polymeric resin and the same EVA polymer employed Example 1 was prepared in accordance with the procedure of that example. However, whereas the LLDPE comprised 90% by weight and the EVA comprised 10% by weight in Example 1, in the composition of the present example the LLDPE comprised 80% by weight and the EVA comprised 20% by weight, based on the total weight of the polymeric composition.

The composition of this example was formed into a film in accordance with the procedure set forth in Example 1. The thus formed film was measured for film thickness and tested to determine its impact strength in accordance with the test procedures discussed in Example 1.

The results of this example are included in the Table.

EXAMPLE 3

A polymeric composition identical to that of Example 1 was prepared but for the specific identity of the EVA polymer. Whereas the EVA of Example 1 was a copolymer of ethylene and vinyl acetate wherein the vinyl acetate constituent comprised 51% by weight vinyl acetate, the polymeric composition of this example utilized an ethylene-vinyl acetate copolymer wherein the vinyl acetate comprised 33% by weight. Moreover, the EVA of this example had a lower degree of polymerization. Whereas the EVA of Example 1 had a melt index of 3.5, the melt index of the EVA of the present polymeric composition was 46. The polymeric composition comprised 90% by weight of the identical LLDPE utilized in Example 1 and 10% by weight of the aforementioned EVA.

The composition of this example was formed into a film in accordance with the procedure set forth in Example 1. The thickness of the thus formed film was measured and the film was tested for impact strength in accordance with the test procedures discussed in Example 1.

A summary of this example is included in the Table.

EXAMPLE 4

Example 3 was identically reproduced but for the relative amounts of the two constituents of the polymeric composition. In this example the concentration of the LLDPE constituent was 80% by weight and the EVA constituted 20% by weight.

The film thickness of this example was measured and its impact strength characteristics determined, in accordance with the procedure of Example 1.

A summary of this example is included in the Table.

EXAMPLE 5

Example 1 was identically reproduced but for the replacement of the EVA of that example with an EVA which had a vinyl acetate content of 45% by weight. In addition, the EVA of the present example was of very low degree of polymerization. Indeed, the EVA of this example was a liquid having a viscosity of 200 centipoises at 140° C.

Again, the film thickness and impact strength characteristics were determined in accordance with the procedures of Example 1.

This example is also summarized in the Table.

EXAMPLE 6

Example 5 was identically reproduced but for the concentrations of the two components comprising the polymeric composition. In this example the LLDPE was present in a concentration of 95% by weight and the liquid EVA was present in a concentration of 5% by weight.

The results of Example 6, including film thickness and impact strength data, are included in the Table.

Comparative Examples 1 to 3

Three films of varying thickness were prepared using only the LLDPE utilized in Examples 1 to 6. The films were produced in accordance with the procedure of Example 1. The thicknesses of these films were measured and thereupon tested in accordance with the impact strength tests discussed in Example 1.

A summary of the comparative examples, including the thickness of the film produced and its impact strength characteristics, is included in the Table.

TABLE

| Exam. No. | LLDPE, % by Wt | EVA, % by Wt | % VA in EVA | Average Thickness, mils | DART F50, 5. | TEDD, lbs |
|---|---|---|---|---|---|---|
| 1 | 90 | 10 | 51 | 1.2 | 640 | 3.4 |
| 2 | 80 | 20 | 51 | 1.4 | 720 | 3.8 |
| 3 | 90 | 10 | 33 | 1.3 | 350 | 3.0 |
| 4 | 80 | 20 | 33 | 1.4 | 330 | 2.4 |
| 5 | 90 | 10 | 45 | 1.6 | 410 | 3.6 |
| 6 | 95 | 5 | 45 | 1.5 | 360 | 2.8 |
| CE1 | 100 | 0 | | 1.4 | 300 | 1.7 |
| CE2 | 100 | 0 | | 1.1 | 220 | 1.6 |
| CE3 | 100 | 0 | | 1.1 | 280 | 1.5 |

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A polymeric film comprising a film formed of:
   a first copolymer of ethylene and an α-olefin having 3 to 12 carbon atoms, said copolymer having a density of between about 0.880 g/cc and about 0.949 g/cc and a melt index of between about 0.01 and about 100, present in a concentration of between 80% and 95% by weight, based on the total weight of the composition; and
   a second copolymer of ethylene and vinyl acetate having a vinyl acetate content of at least 45% by weight, based on the total weight of the ethylene-vinyl acetate copolymer, present in a concentration of between 5% and 20% by weight, based on the total weight of the composition.

2. A polymeric film in accordance with claim 1 wherein said first copolymer has a density of between about 0.900 g/cc. and about 0.935 g/cc. and a melt index of between about 0.1 and about 10.

3. A polymeric film in accordance with claim 2 wherein said first copolymer has a density of between about 0.910 g/cc. and about 0.935 g/cc. and a melt index of between about 0.5 and about 3.

4. A polymeric film in accordance with claim 1 wherein said first copolymer is a copolymer of ethylene and a higher α-olefin having 4 to 8 carbon atoms.

5. A polymeric film in accordance with claim 1 wherein said first copolymer includes ethylene in a molar concentration of between about 90% and about 99% and said higher α-olefin in a molar concentration of between about 1% and about 9%, said percentages based on the total molar concentration of said first copolymer.

6. A polymeric film in accordance with claim 5 wherein said molar concentration of ethylene and said first copolymer is in the range of between about 92% and about 98% and said α-olefin is present in a molar concentration in the range of between about 2% and about 8%.

7. A polymeric film in accordance with claim 6 wherein said higher α-olefin of said first copolymer is selected from the group consisting of butene-1, hexene-1 and octene-1.

8. A polymeric film in accordance with claim 7 wherein said higher α-olefin is hexene-1.

9. A polymeric film in accordance with claim 1 wherein said second copolymer is an ethylene-vinyl acetate copolymer which includes a vinyl acetate content of between 45% and 65% by weight, based on the total weight of said ethylene-vinyl acetate copolymer.

10. A polymeric film in accordance with claim 2 wherein said vinyl acetate is present in said ethylene-vinyl acetate copolymer in a concentration of between 45% and 65% by weight, based on the total weight of said ethylene-vinyl acetate copolymer.

11. A polymeric film in accordance with claim 1 wherein said first copolymer comprises between 80% and 90% by weight; and said second copolymer comprises between 10% and 20% by weight, said percentages based on the total weight of said polymeric composition.

12. A polymeric film comprising a film formed of:
a first copolymer of ethylene and α-olefin having 4 to 8 carbon atoms, said copolymer having a density of between about 0.900 g/cc and about 0.935 g/cc and a melt index of between 0.1 and about 10, present in a concentration of between 80% and 95% by weight, based on the total weight of the composition; and
a second copolymer, present in a concentration of between 5% and 20% by weight, based on the total weight of the polymeric composition, of ethylene and vinyl acetate which includes a vinyl acetate content of between 45% and about 65% by weight, based on the total weight of said ethylene-vinyl acetate copolymer.

13. A polymeric film in accordance with claim 12 wherein said first copolymer is a copolymer of ethylene and an α-olefin is selected from the group consisting of butene-1, hexene-1 and octene-1, said first copolymer having a density of between about 0.910 g/cc. and about 0.935 g/cc. and a melt index of between about 0.5 and about 3, present in a concentration of between 80% and 90% by weight, based on the total weight of the polymeric composition; and
a second copolymer of ethylene and vinyl acetate wherein said vinyl acetate is present in a concentration of between 45% and about 55% by weight, based on the total weight of the ethylene-vinyl acetate copolymer, said second copolymer present in a concentration of between 10% and 20% by weight, based on the total weight of the polymeric composition.

14. A polymeric film in accordance with claim 13 wherein said first copolymer is a copolymer of ethylene and hexene-1.

* * * * *